United States Patent
Esno et al.

(10) Patent No.: US 9,243,910 B1
(45) Date of Patent: Jan. 26, 2016

(54) ROUTE IMAGE GENERATING SYSTEM, DEVICE, AND METHOD

(71) Applicants: David M. Esno, Swisher, IA (US); Keith J. Feldkamp, Robins, IA (US); Charles F. Steffen, Cedar Rapids, IA (US); Brent J. Nelson, Marion, IA (US)

(72) Inventors: David M. Esno, Swisher, IA (US); Keith J. Feldkamp, Robins, IA (US); Charles F. Steffen, Cedar Rapids, IA (US); Brent J. Nelson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 262 days.

(21) Appl. No.: 14/011,210

(22) Filed: Aug. 27, 2013

(51) Int. Cl.
| | |
|---|---|
| G01C 5/00 | (2006.01) |
| G01C 21/00 | (2006.01) |
| G08G 5/00 | (2006.01) |
| G01C 23/00 | (2006.01) |
| G01S 13/93 | (2006.01) |
| G01S 13/94 | (2006.01) |

(52) U.S. Cl.
CPC ............... *G01C 21/00* (2013.01); *G01C 23/00* (2013.01); *G01S 13/9303* (2013.01); *G01S 13/94* (2013.01); *G08G 5/0034* (2013.01); *G08G 5/0086* (2013.01)

(58) Field of Classification Search
CPC ...... G01C 5/005; G01C 23/00; G01C 23/005; G08G 5/006; G08G 5/0086; G01S 13/9303; G01S 13/94
See application file for complete search history.

(56) References Cited

U.S. PATENT DOCUMENTS

| | | | | |
|---|---|---|---|---|
| 6,275,771 | B1 * | 8/2001 | Berstis et al. ................. | 701/482 |
| 6,347,263 | B1 * | 2/2002 | Johnson .................. | G01C 5/005 340/970 |
| 6,424,889 | B1 * | 7/2002 | Bonhoure ............ | G05D 1/0202 244/183 |
| 6,577,947 | B1 * | 6/2003 | Kronfeld ................ | G01C 21/00 701/301 |
| 7,714,744 | B1 * | 5/2010 | Wichgers ............... | G08G 5/045 340/945 |
| 7,813,845 | B2 * | 10/2010 | Doose .................... | G01C 21/26 340/951 |
| 7,965,202 | B1 * | 6/2011 | Chiew .................... | G01C 23/00 340/973 |
| 8,073,578 | B1 * | 12/2011 | McCusker ........... | G08G 5/0034 701/10 |
| 8,234,020 | B1 * | 7/2012 | Wichgers ............... | G01C 5/005 701/9 |
| 8,234,068 | B1 | 7/2012 | Young et al. | |
| 8,718,915 | B1 * | 5/2014 | Turcios ................ | G01C 23/005 342/176 |
| 8,798,815 | B1 * | 8/2014 | Burgin et al. ..................... | 701/9 |
| 8,897,935 | B2 * | 11/2014 | Meunier .............. | G01C 23/005 340/947 |
| 2001/0013836 | A1 * | 8/2001 | Cowie .................. | G08G 5/0078 340/961 |

(Continued)

OTHER PUBLICATIONS

"Terrain Awareness and Warning System (TAWS)", Jun. 27, 2012, Technical Standard Order TSO-C151c, U.S. Federal Administration Agency, Washington, D.C.

*Primary Examiner* — Thomas G Black
*Assistant Examiner* — Ce Li
(74) *Attorney, Agent, or Firm* — Angel N. Gerdzhikov; Donna P. Suchy; Daniel M. Barbieri

(57) ABSTRACT

A present novel and non-trivial system, device, and method for generating a route image presentable on a display unit is disclosed, where a route may be presented to draw a viewer's attention to one or more objects located along or below the route. An image generator ("IG") may be configured to receive navigation data; receive object data; construct one or more raised ground track profiles as a function of the first elevations and one or more object clearance distances; identify, if any, one or more penetrated segments of one or more raised ground track profiles; and generate an image data set representative of an image of a divisible route configured to present a plurality of route section highlighters comprised of one or more first route section highlighters corresponding to non-penetrated segment(s) and at least one second or subsequent route section highlighters corresponding to first or subsequent penetrated segment(s), respectively.

17 Claims, 10 Drawing Sheets

(56) References Cited

U.S. PATENT DOCUMENTS

| | | | | |
|---|---|---|---|---|
| 2001/0056316 | A1* | 12/2001 | Johnson | G01C 5/005 701/14 |
| 2005/0137758 | A1* | 6/2005 | He | G01C 23/005 701/3 |
| 2008/0262664 | A1* | 10/2008 | Schnell | G01C 23/00 701/4 |
| 2008/0288169 | A1* | 11/2008 | Meunier | G01C 5/005 701/301 |
| 2008/0306680 | A1* | 12/2008 | Marty | G01C 21/00 701/533 |
| 2009/0248297 | A1 | 10/2009 | Feyersisen et al. | |
| 2010/0042273 | A1* | 2/2010 | Meunier | G01C 23/005 701/9 |

* cited by examiner

ROUTE IMAGE GENERATING SYSTEM, DEVICE, AND METHOD

BACKGROUND OF THE INVENTION

1. Field of the Invention

This invention pertains generally to the field of display systems such as, but not limited to, aircraft display systems.

2. Description of the Related Art

The United States Federal Aviation Administration ("FAA") has published a Technical Standard Order ("TSO") identified as TSO-151c in which minimum performance standards of a Terrain Awareness and Warning System ("TAWS") are specified. TSO-151c defines standards of alert conditions corresponding to forward looking terrain avoidance ("FLTA") functions, a premature descent alert ("PDA") function, and a plurality of ground proximity functions. For each of these functions, visual and aural alerts are required if specific conditions stated in the TSO-151c are met. For visual alerts, amber and red text messages are required for caution and warning alerts, respectively. Although text alerts are specified in TSO-151c, there is no requirement to present other forms of visual presentation(s) or to provide useful, graphical general terrain information.

With respect to a flight plan, an image of an aerial pathway that appears on an aircraft display unit is useful and informative to the pilot of an aircraft; for one reason, it provides guidance information within the scene outside the aircraft, thereby enhancing a pilot's situational awareness. One image of an aerial pathway is commonly referred to as a highway-in-the-sky ("HITS"), the generation and employment of which are known to those skilled in the art. An aerial pathway comprised of an abbreviated pathway has been disclosed by Chiew et al in U.S. Pat. No. 7,965,202 ("the Chiew reference"), where the abbreviated pathway comprised of a series of connected waypoints was shown. Although the HITS pathway and abbreviated pathway disclosed in the Chiew reference provide useful guidance information, it is difficult to discern the ground track underneath the pathway. Moreover, it is difficult to visually discern approaching terrain clearances; that is, the distances between the altitude of the aircraft and the terrain over which it is expected to fly.

BRIEF SUMMARY OF THE INVENTION

A present novel and non-trivial system, device, and method for generating a route image presentable on a display unit are disclosed. With the embodiments disclosed herein, a route presented on one or more display units may be divided into terrain clearance-dependent section(s) and presented to draw a viewer's attention to one or more objects located along the ground tract and/or flight plan.

In one embodiment, a system is disclosed for generating a route image presentable on a display unit. The system may be comprised a source of navigation data, a source of object data, and an image generator ("IG"). The source of navigation data could be configured to provide data representative of at least aircraft position and heading, and the source of object data could be configured to provide object data representative of location and elevations of object cells. In an additional embodiment, the system could also be comprised of an indicating system configured to present an image represented in an image data set on one or more display units.

In another embodiment, a device is disclosed for generating a route image presentable on a display unit. The device may be comprised of the IG configured to perform the method disclosed in the following paragraph.

In another embodiment, a method is disclosed for generating a route image presentable on a display unit. The method may be comprised of receiving navigation data; receiving object data corresponding to the navigation data; constructing one or more raised ground track profiles as a function of the first elevations and one or more object clearance distances; identifying, if any, one or more penetrated segments of one or more raised ground track profiles; and generating an image data set representative of an image of a divisible route configured to present a plurality of route section highlighters comprised of one or more first route section highlighters corresponding to non-penetrated segment(s) and at least one second or subsequent route section highlighters corresponding to first or subsequent penetrated segment(s), respectively. Additionally, the method may be further comprised of providing the image data set to the indicating system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
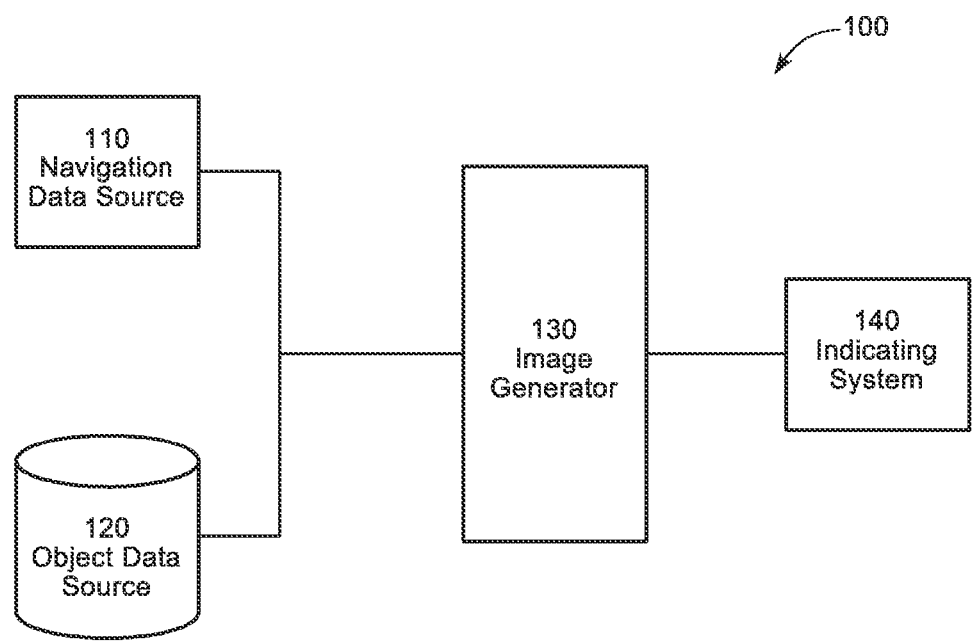
FIG. 1 depicts a block diagram of a system for generating a route image presentable on a display unit.

FIG. 1 depicts a block diagram of a route image generating and/or presenting system 100 suitable for implementation of the techniques described herein. The presentation system 100 of an embodiment of FIG. 1 includes a navigation data source 110, an object data source 120, an image generator ("IG") 130, and an indicating system 140.

In the embodiment of FIG. 1, the navigation data source 110 could be comprised of a system or systems that may provide navigation data information in an aircraft. A navigation system 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, and attitude. As embodied herein, aircraft position may be comprised of geographic position (e.g., latitude and longitude coordinates) and altitude, and ground track may be derived from either geographic position, aircraft position, or both. As embodied herein, aircraft orientation may be comprised of pitch, roll, and/or yaw information related to the attitude of the aircraft. As embodied herein, the navigation data source 110 could be configured to provide navigation data to the IG 130 for subsequent processing as discussed herein.

In an embodiment of FIG. 1 the navigation data source 110 could be further comprised of a flight management system ("FMS") which could perform a variety of functions performed to help the crew in the management of the flight; these functions are known to those skilled in the art. These functions could include receiving a flight plan (or planned flight route) and constructing a lateral and vertical flight plan from the flight plan. The flight plan could be comprised of a series of waypoints, where each waypoint could include an altitude constraint associated with it. A pilot could create a flight plan by entering waypoints stored in a database or select a flight plan stored in a database of the FMS; also, the flight plan could be received and loaded into the FMS automatically through a datalink system known to those skilled in the art.

Also, a flight plan may be modified at any time. For lateral elements, waypoints could be inserted or deleted, holding procedures could be inserted or modified, legs to fly directly to waypoints may be inserted, the destination or alternate airport may be changed, and/or an offset path could be created to avoid hazardous meteorological conditions. For vertical elements, flight altitudes and/or flight levels may be modified.

It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. Additionally, aircraft could be watercraft capable of operating on or beneath water.

In the embodiment of FIG. 1, the object data source 120 could be comprised of any source of object data such as, but not limited to, data representative of elevations and/or locations of terrain, obstacles, other manmade or natural features, geopolitical boundaries, defined airspace, or any combination thereof. As embodied herein, the object data source 120 could be configured to provide object data to the IG 130 for subsequent processing as discussed herein.

As embodied herein, the object data source 120 may include, but is not limited to, a terrain database and other aircraft systems which could employ object data. The terrain database may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including the terrain database may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle in the terrain database could be stored, a temporary runway closure in an airport database, and a temporary flight restriction in an airspace database.

Any database disclosed herein may be a stand-alone database or a combination of databases. For example, the terrain database may be associated with a terrain awareness and warning system ("TAWS") only. In an alternative embodiment, the terrain data could be stored in or combined with an airport database, airspace database, or with a database used by any other aircraft system including, but not limited to, a database associated with the FMS of the navigation data source 110 and an airspace awareness and warning system ("AAWS"). An example of a TAWS has been disclosed by Wichgers et al in U.S. Pat. No. 8,234,020 entitled "System and Methods for Generating Alert Signals in a Terrain Awareness and Warning System," which is incorporated by reference herein in its entirety. An example of an AAWS which utilizes airport and airspace databases has been disclosed by Wichgers in U.S. Pat. No. 7,714,744 entitled "System and Methods for Generating Alert Signals in an Airspace Awareness and Warning System," which is incorporated by reference herein in its entirety.

In an embodiment of FIG. 1, the IG 130 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 130 may be programmed or configured to drive the execution of software or source code containing algorithms developed for the specific functions embodied herein. As embodied herein, the terms "programmed" and "configured" are synonymous with respect to the execution of software or source code developed for the specific functions and methods embodied herein. The IG 130 may be electronically coupled to systems and/or sources of data to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, the IG 130 could be a processor(s) used by or in conjunction with any other system of the aircraft including, but not limited to, a processor(s) associated with a vision system such as a synthetic vision system ("SVS"), an enhanced vision system ("EVS"), a combined SVS-EVS, an FMS, a TAWS, an AAWS, an indicating system or a display unit(s) thereof, or any combination thereof.

In the embodiment of FIG. 1, the indicating system 140 could be comprised of any unit configured to present a viewer with information. Such unit could include, but is not limited to, a Head-Down Display ("HDD"), Head-Up Display ("HUD"), Head (or Helmet) Mounted Display ("HMD"), and/or a portable electronic device such as, but not limited to, a notebook computer and/or tablet. As embodied herein, the display unit(s) may be included as part of a vision system such as the SVS, the EVS, the combined SVS-EVS, or combination thereof. As embodied herein, the indicating system 140 could be configured to receive data from the IG 130.

Figure 2A:
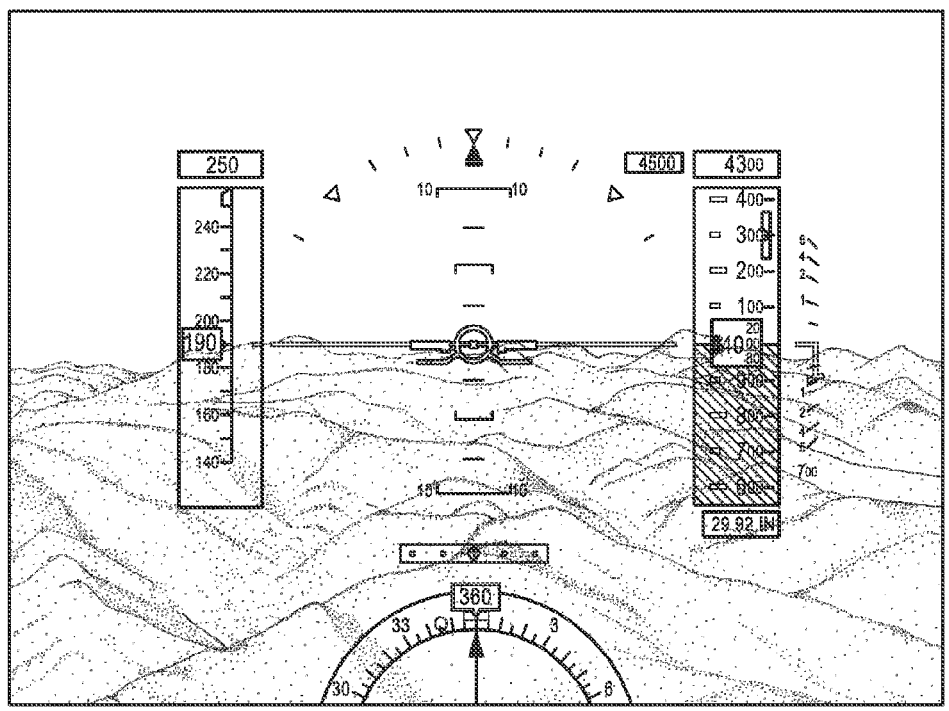
FIG. 2A presents an exemplary illustration of a Head-Down Display ("HDD") unit.
Figure 2B:
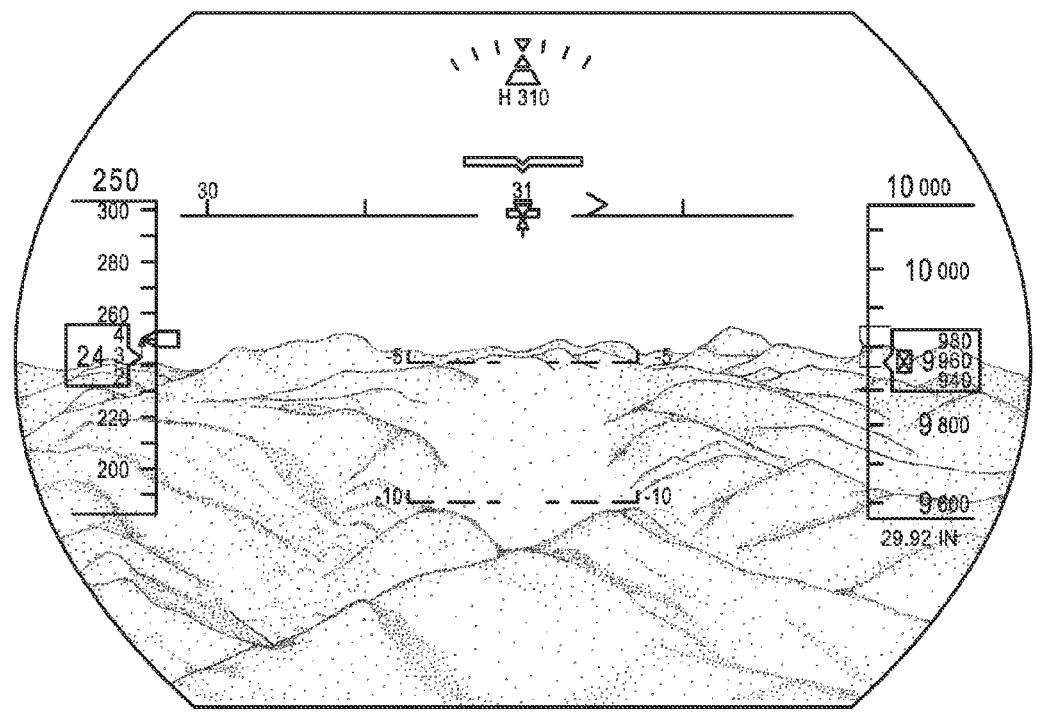
FIG. 2B presents an exemplary illustration of a Head-Up Display ("HUD") unit.

FIGS. 2A and 2B provide exemplary illustration of an HDD unit and a HUD unit, respectively, both of which provide tactical flight information. As illustrated in FIG. 2A, the HDD unit could be configured to display the same tactical flight information or symbology found on a primary flight display ("PFD"), such as "basic T" information (i.e., airspeed, attitude, altitude, and heading). Although it may provide the same information as that of a PFD, the HDD unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HDD unit is designed to provide flexible configurations which may be tailored to the desired configuration specified by a buyer or user of the aircraft.

The HUD unit of FIG. 2B could be configured to display tactical information to the pilot or flight crew, in the pilot's forward field of view through the windshield, eliminating transitions between head-down to head-up flying. Similar to the HDD unit, the HUD unit may be tailored to the desired configuration specified by a buyer or user of the aircraft.

Figure 3A:
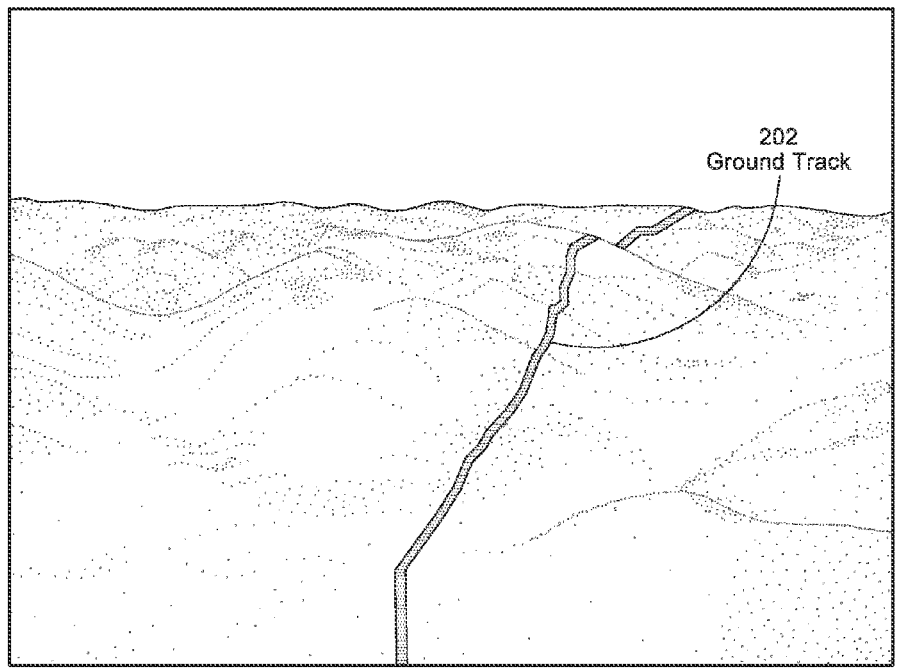
FIG. 3A depicts an example of a route (e.g., ground track) presented on an HDD unit.
Figure 3B:
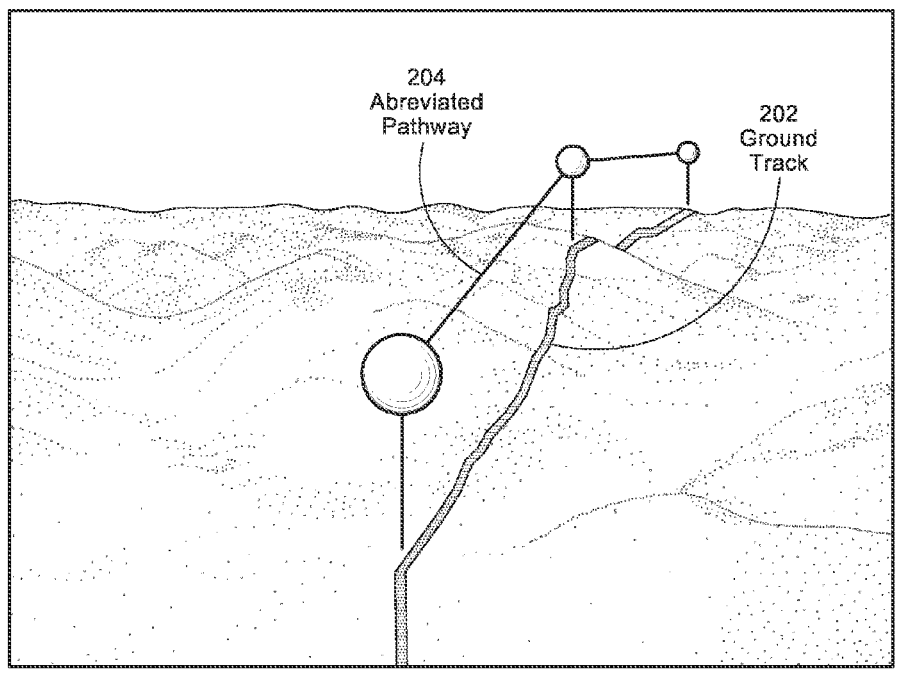
FIG. 3B depicts an example of two routes (e.g., ground track and abbreviated pathway) presented on an HDD unit.

FIGS. 3A and 3B provide illustrations of a predicted ground track presented on an HDD unit; although absent from the illustration, the predicted ground track could be displayed along with tactical flight information or symbology. The predicted ground track could be a track along the ground over which the aircraft is predicted to fly.

The predicted ground track could be based upon the direction of an instant ground track (i.e., the ground track currently or presently being experience in the flight). Data representative of the instant ground track could be provided by the navigation data source 110 or could be derived from the data provided from the navigation data source 110 (e.g., successive geographic positions). The predicted ground track could also be based upon the flight plan comprised of a series of waypoints, where data representative of the flight plan could be provided by the navigation data source 110.

As shown in FIG. 3A, a predicted ground track 202 is presented against a background of a three-dimensional perspective; the predicted ground track 202 of FIG. 3A may be based upon the instant ground track or flight plan. Based upon the flight plan, the predicted ground track 202 could also be presented below an abbreviated pathway 204 indicating of a series of waypoints defining the flight plan as shown in FIG. 3B. The abbreviated pathway 204 has been disclosed by Chiew et al in U.S. Pat. No. 7,965,202 ("the Chiew reference"), a reference incorporated herein in its entirety. Instead of the abbreviated pathway 204, the predicted ground track 202 could also be presented below a highway-in-the sky pathway ("HITS"), an illustrative image of which is presented in the Chiew reference. As embodied herein, a flight pathway could be comprised of an abbreviated pathway, a HITS pathway, or any other image that provides visual guidance of a flight plan to the pilot.

The advantages and benefits of the embodiments discussed herein may be illustrated by disclosing how a plurality of ground track section highlighter configurations may be employed to alter the visual appearance of the predicted ground track. Referring to FIGS. 4A through 4D, an aircraft 206, a plurality of altitude profiles 207, a plurality of raised ground track profiles (singularly, "raised GTP") 208, a configuration indicator 210 of section highlighters, a ground track profile ("GTP") 212, and a plurality of terrain clearance distances (singularly, "TCD") 214 are shown in each.

The aircraft 206 is predicted to fly over the mountainous or hilly terrain indicated by the GTP 212. Each altitude profile 207 could indicate the current altitude of the aircraft. As discussed below, each raised GTP 208 could indicate a fixed or variable distance above and parallel to the GTP 212. The configuration indicator 210 may be used to demonstrate a derivation process of dividing the terrain cells of the predicted ground track into sections and determining a section highlighter configuration applicable to each section through the use of one or more raised GTPs 208.

The GTP 212 may be constructed from terrain data retrieved from the object data source 120. Once a predicted ground track and/or the locations comprising the predicted ground track have been established, data representative of terrain cells located along the predicted ground track may be retrieved, where each terrain cell corresponds to a location along the predicted ground track and includes the elevation of the terrain cell. Knowing the elevation of each terrain cell along the predicted ground track, the ground track profile 212 comprised of a plurality of elevations of the terrain cells located along the predicted ground track may be constructed when plotted and referenced to a common scale (such as mean sea level ("MSL")).

One or more of a plurality of TCDs 214 may be employed in one or more configurations. In one configuration, a manufacturer and/or end-user may decide to employ one TCD 214 comprised of a fixed value. For example, the manufacturer and/or end-user could select a fixed value (e.g., 1,000 feet) for the TCD 214 independent of any other factor(s). As will become evident from the discussion presented below, one or more sections of the predicted ground track may be highlighted if the difference between the altitude of the aircraft and the elevation of the terrain within the section(s) is less than or equal to the fixed value.

In another configuration, a manufacturer and/or end-user may decide to employ one or more TCDs comprised of a variable(s), where such variable(s) may depend on one or more factors such as different phases of flight (e.g., terminal, approach, departure, and enroute), flight attitudes (e.g., level, descending, or climbing flight), or both.

A terminal phase of flight could exist when the aircraft is a pre-defined distance (e.g., 15 nautical miles ("NM")) or less from the nearest runway while the range to the nearest runway threshold is decreasing and the aircraft is operating at or below (lower than) an upper terminal phase boundary altitude, where the value of the upper terminal phase boundary altitude varies as a function of height above runway and distance to the runway. Generally, the terminal phase of flight ends where the approach phase begins.

An approach phase of flight could exist when the aircraft is a pre-defined distance (e.g., 5 NM) or less to the nearest runway threshold, the height above the nearest runway threshold location and elevation is equal to or less than a pre-defined altitude (e.g., 1,900 feet), and distance to the nearest runway threshold is decreasing.

A departure phase of flight could exist if an aircraft is on the ground upon initial power-up. A reliable parameter may be used to determine whether or not the aircraft is on the ground. For example, one parameter which could initially determine the aircraft to be on the ground could be a signal generated by a "squat switch" to indicate whether or not the aircraft is on the ground. Other parameters such as speed and altitude could be used to determine whether or not the aircraft is on the ground or airborne. For example, an aircraft could be "on the ground" if it is operating at a speed less than 35 knots and altitude within +/−75 feet of field elevation or nearest runway elevation. Similarly, an aircraft could be "airborne" if it is operating at a speed greater than 50 knots and altitude 100 feet greater than field elevation; in this example, it can be reliably determined that the aircraft is operating in the departure phase of flight. Other parameters which may be considered are climb state, and distance from departure runway. Once the aircraft reaches a pre-defined altitude (e.g., 1,500 feet above the departure runway), the departure phase could end.

An enroute phase of flight may exist anytime the aircraft is more than a pre-defined distance (e.g., 15 NM) from the nearest airport or whenever the conditions for terminal, approach and departure phases of flight are not met.

As embodied herein, the value of the TCD(s) 214 may depend on a phase of flight and flight attitude. For example, if an aircraft is operating in the enroute phase of flight, one TCD 214 could be 700 feet if operating in level flight attitude and 500 feet if operating in descending flight attitude. In another example, if an aircraft is operating in the terminal phase of flight, one TCD 214 could be 350 feet if operating in level flight attitude and 300 feet operating in descending flight attitude. In another example, if an aircraft is operating in the approach phase of flight, one TCD 214 could be 150 feet if operating in level flight attitude and 100 feet operating in descending flight attitude. The value of the TCD 214 may depend on the phase of flight and not flight attitude. For example, if an aircraft is operating in the departure phase of flight, one TCD 214 could be set to one value (e.g., 100 feet) irrespective of flight attitude. It should also be noted that level flight attitude may or may not include aircraft operating at relatively low vertical speeds and the values may differ across the phases of flight. For example, an aircraft climbing or descending at a rate of 500 feet per minute may be considered as operating in level flight in one phase of flight but not in another.

Those skilled in the art will recognize the values used in the preceding examples are associated with some of the minimum performance standards of a Terrain Awareness and Warning System ("TAWS") published by the United States Federal Aviation Administration ("FAA") in a Technical Standard Order ("TSO") identified as TSO-151c, a reference incorporated herein in its entirety. Although TSO-151c states specific values of minimum terrain clearances, those skilled in the art will readily acknowledge that aviation regulatory authorities such as the FAA may modify minimum performance standards with subsequent changes, amendments, or revisions. In addition, other aviation regulatory authorities could develop separate minimum performance standards which differ from those published by the FAA. The embodiments and discussion herein with respect to phases of flight and values of one or more TCDs 214 are illustrations intended solely to provide examples and are in no way intended to be limited to those discussed and presented herein. As embodied herein, the IG 130 may determine phase of flight, flight attitude, and one or more TCDs 214 data with algorithms programmed in executable software code. Those skilled in the art will appreciate the ability and ease with which executable software code may be reprogrammed or modified to facilitate subsequent or concurrent performance standards without affecting or expanding the scope of the embodiments discussed herein.

For the discussion of FIGS. 4A through 4D, it will be assumed that a manufacturer and/or end-user has selected to employ a configuration comprised of three TCDs 214. For the sake of illustration and not of limitation, each TCD 214 could correspond to one or more fixed value(s) and/or one or more variable value(s).

For a fixed value(s), a manufacturer and/or end-user could elect to highlight sections ahead of the aircraft and dependent upon the distance(s) between the aircraft; for example, one highlighter could highlight a section along the route in which terrain is located less than 1,500 feet below the aircraft, a second could highlight section of the route in which the terrain is location less than 1,000 feet below the aircraft, and a third section could highlight a section of the route in which the terrain is located less than 500 feet below the aircraft.

For variable value(s), a manufacturer and/or end-user could elect to highlight sections that correspond to terrain clearances specified in TSO-151c. With such a configuration, the pilot may be informed of a proximity of the aircraft to terrain even though a caution alert and/or a warning alert will not be generated pursuant to the TSO-151 c. For variable value(s) corresponding to TSO-151c, the IG 130 may be programmed to receive and/or retrieve navigation data necessary to make a determination of phase of flight and flight attitude, factors used by TSO-151c in determining in the generation of alerts. Based upon the values of the TCDs 214, a plurality of parallel raised GTPs 208 that are positioned above the GTP 212 at a corresponding TCD 214 may be constructed.

Figure 4A:
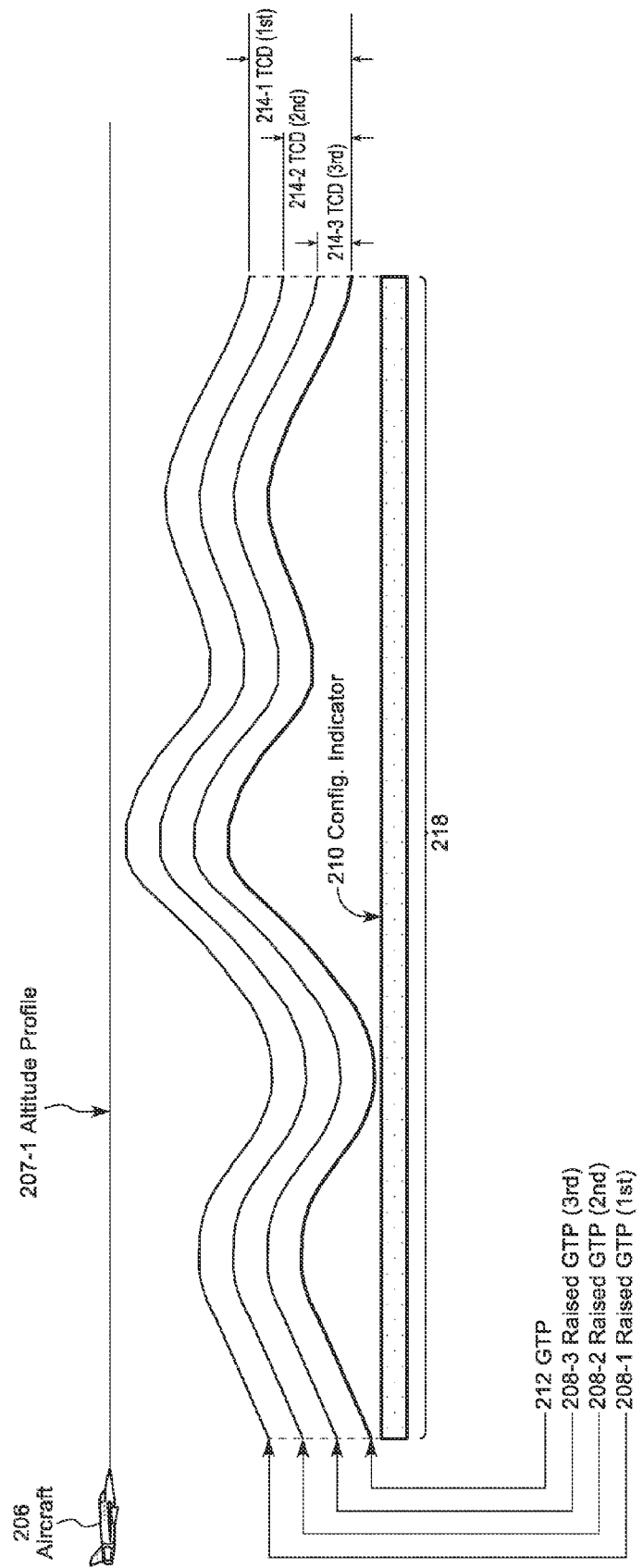
FIG. 4A illustrates a first altitude profile, three raised ground track profiles ("raised GTPs"), and a ground track profile ("GTP").

Referring to FIG. 4A, the altitude of the aircraft 206 is above flying at the raised GTPs 208 as indicated by altitude profile 207-1; that is, none of the raised GTPs 208 have penetrated the altitude profile 207-1. In this scenario, the configuration indicator 210 indicates a first route section highlighter comprised of a first ground track section highlighter ("section highlighter") in section 218 for each cell located along the GTP 212 of the predicted ground track. It should be noted that, although the discussion herein will be drawn towards route section highlighters comprised of ground track section highlighter(s), the disclosures herein could be applied additionally and/or alternatively toward route section highlighters comprised of flight pathway section highlighter(s) highlighting sections of a flight pathway.

Figure 4B:
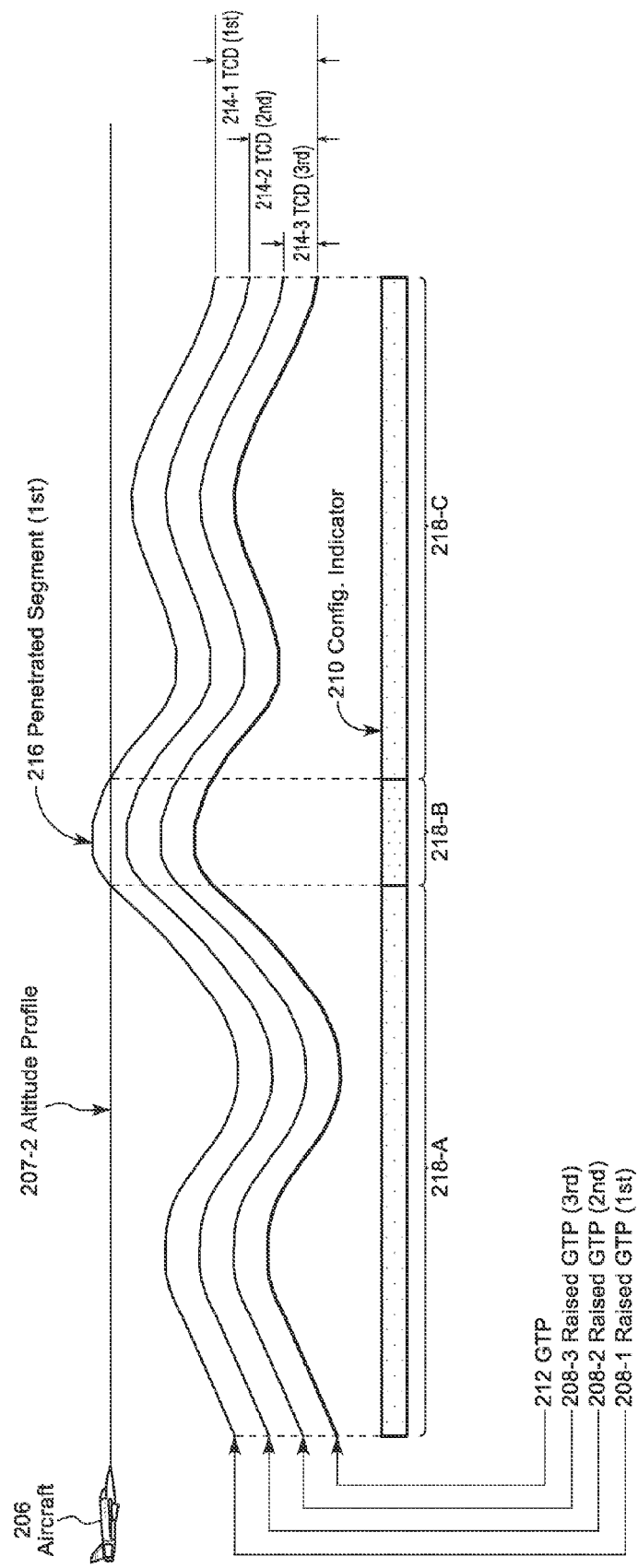
FIG. 4B illustrates a second altitude profile, three raised GTPs, and a GTP.

Referring to FIG. 4B, the altitude of the aircraft 206 is flying above at the raised GTPs 208-2 and -3 but not above raised GTP 208-1 as indicated by altitude profile 207-2; that is, the raised GTP 208-1 has penetrated the altitude profile 207-2 as indicated by a first penetrated segment 216 located in between the boundaries of section 218-B. Here, the difference between the altitude of the aircraft and the elevation of each terrain cell corresponding to the first penetrated segment 216 is equal to or less than TCD 214-1 of the raised GTP 208-1.

In this scenario, the configuration indicator 210 indicates a plurality of section highlighters. The first section highlighter has been employed in sections 218-A and 218-C to highlight each cell located along the GTP 212 of the predicted ground track corresponding to non-penetrated segments of the raised GTP 208-1, and a second section highlighter has been employed in section 218-B to highlight each cell located along the GTP 212 of the predicted ground track corresponding to the first penetrated segment 216.

Figure 4C:
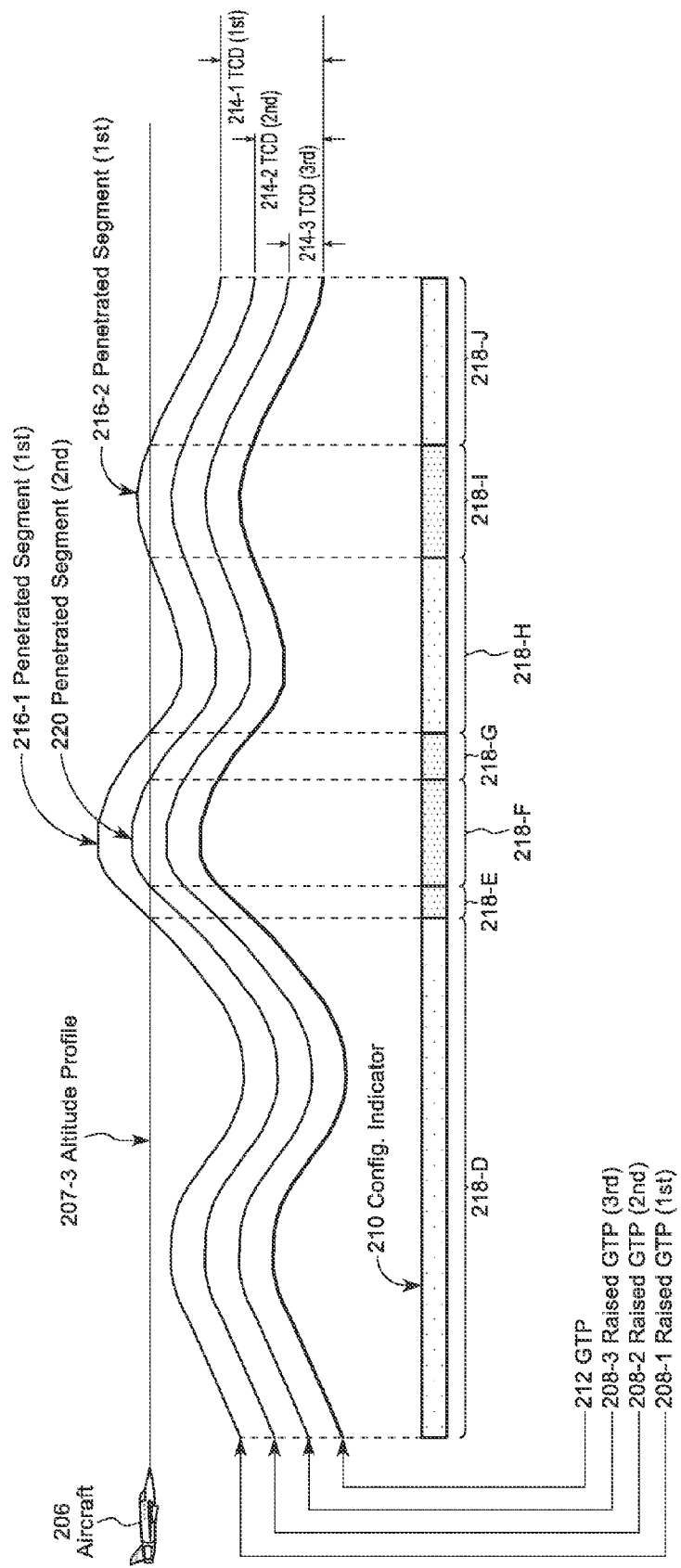
FIG. 4C illustrates a third altitude profile, three raised GTPs, and a GTP.

Referring to FIG. 4C, the altitude of the aircraft 206 is flying above at the raised GTPs 208-3 but not above raised GTPs 208-1 and 208-2 as indicated by altitude profile 207-3; that is, the raised GTPs 208-1 and -2 have penetrated the altitude profile 207-3 as indicated by the first penetrated segments 216-1 and 216-2, and a second penetrated segment 220. The first penetrated segment 216-1 is located in between the left boundary of section 218-E and the right boundary of section 218-G, and the first penetrated segment 216-2 is located in between the boundaries of section 218-I. The second penetrated segment 220 is located in between the boundaries of section 218-F. Here, the difference between the altitude of the aircraft and the elevation of each terrain cell corresponding to the first penetrated segments 216-1 and 216-2 is equal to or less than TCD 214-1 of the raised GTP 208-1, and the difference between the altitude of the aircraft and the elevation of each terrain cell corresponding to the second penetrated segment 220 is equal to or less than TCD 214-2 of the raised GTP 208-2.

In this scenario, the configuration indicator 210 indicates a plurality of section highlighters. The first section highlighter has been employed in sections 218-D, 218-H, and 218-J to highlight each cell located along the GTP 212 of the predicted ground track corresponding to non-penetrated segments of raised GTP 208-1. The second section highlighter has been employed in sections 218-E, 218-G, and 218-I to highlight each cell located along the GTP 212 of the predicted ground track corresponding to the first penetrated segments 216-1 and 216-2 that are not corresponding to the second penetrated segment 220. A third section highlighter has been employed in section 218-F to highlight each cell located along the GTP 212 of the predicted ground track corresponding to the second penetrated segment 220.

Figure 4D:
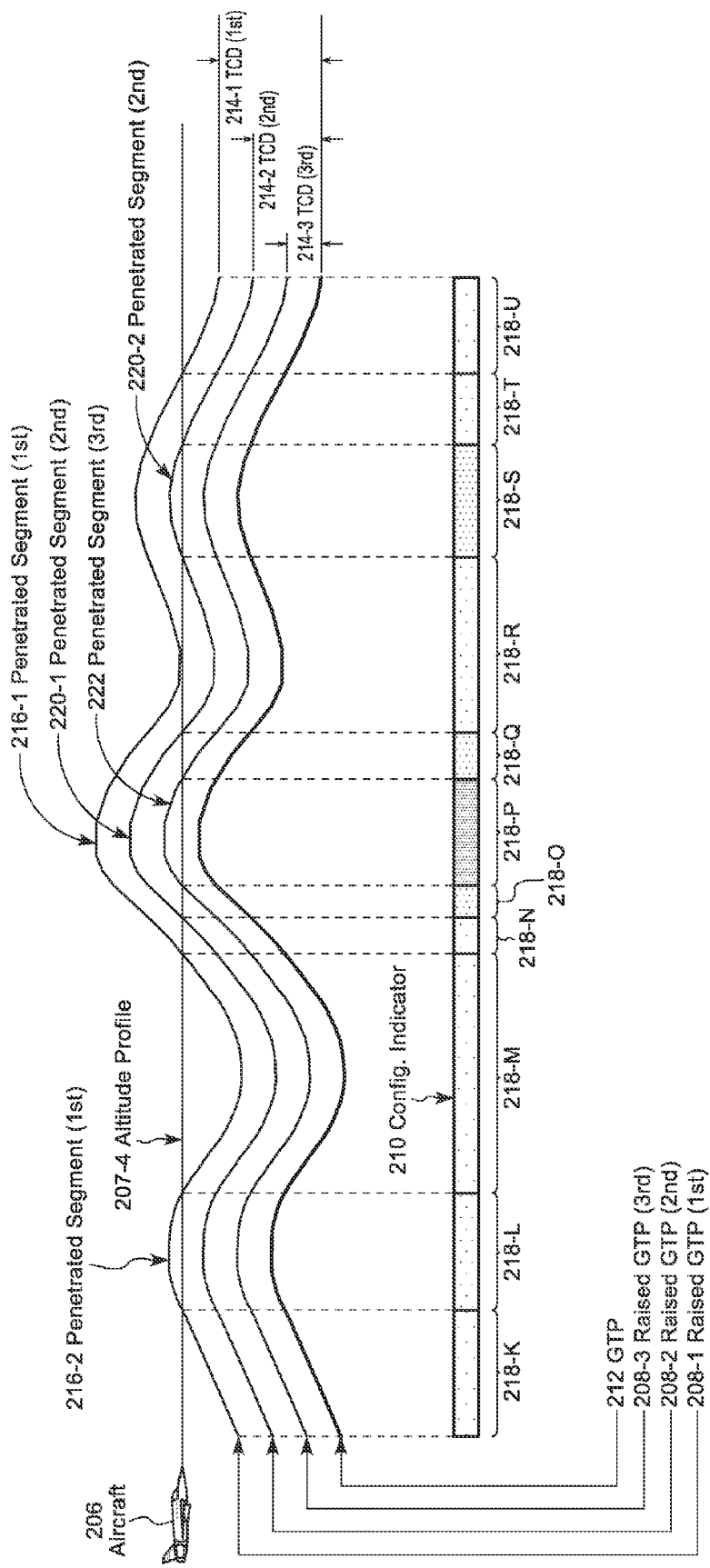
FIG. 4D illustrates a fourth altitude profile, three raised GTPs, and a GTP.

Referring to FIG. 4D, the altitude of the aircraft 206 is not flying above any of the raised GTPs 208 as indicated by altitude profile 207-4; that is, the raised GTPs 208 have penetrated the altitude profile 207-4 as indicated by the first penetrated segments 216-1 and 216-2, the second penetrated segments 220-1 and 220-2, and a third penetrated segment. The first penetrated segment 216-1 is located in between the left boundary of section 218-N and the right boundary of section 218-T, and the first penetrated segment 216-2 is located in between the boundaries of section 218-L. The second penetrated segment 220-1 is located in between the left boundary of section 218-O and the right boundary of section 218-Q, and the second penetrated segment 220-2 is located in between the boundaries of section 218-S. The third penetrated segment 222 is located in between the boundaries of section 218-P. Here, the difference between the altitude of the aircraft and the elevation of each terrain cell corresponding to the first penetrated segments 216-1 and 216-2 is equal to or less than TCD 214-1 of the raised GTP 208-1, the difference between the altitude of the aircraft and the elevation of each terrain cell corresponding to the second penetrated segments 220-1 and 220-2 is equal to or less than TCD 214-2 of the raised GTP 208-2, and the difference between the altitude of the aircraft and the elevation of each terrain cell corresponding to the third penetrated segment 220 is equal to or less than TCD 214-3 of the raised GTP 208-3.

In this scenario, the configuration indicator 210 indicates a plurality of section highlighters. The first section highlighter has been employed in sections 218-K, 218-M, and 218-U to highlight each cell located along the GTP 212 of the predicted ground track corresponding to non-penetrated segments of raised GTP 208-1. The second section highlighter has been employed in sections 218-L, 218-N, 218-R, and 218-T to highlight each cell located along the GTP 212 of the predicted ground track corresponding to the first penetrated segments 216-1 and 216-2 that are not corresponding to the second penetrated segments 220-1 and 220-2 and the third penetrated segment 222. The third section highlighter has been employed in section 218-O, 218-Q, and 218-S to highlight each cell located along the GTP 212 of the predicted ground track corresponding to the second penetrated segments 220-1 and 220-2 that are not corresponding to the third penetrated segment 222. A fourth section highlighter has been employed in section 218-P to highlight each cell located along the GTP 212 of the predicted ground track corresponding to the third penetrated segment 222.

Figure 5:
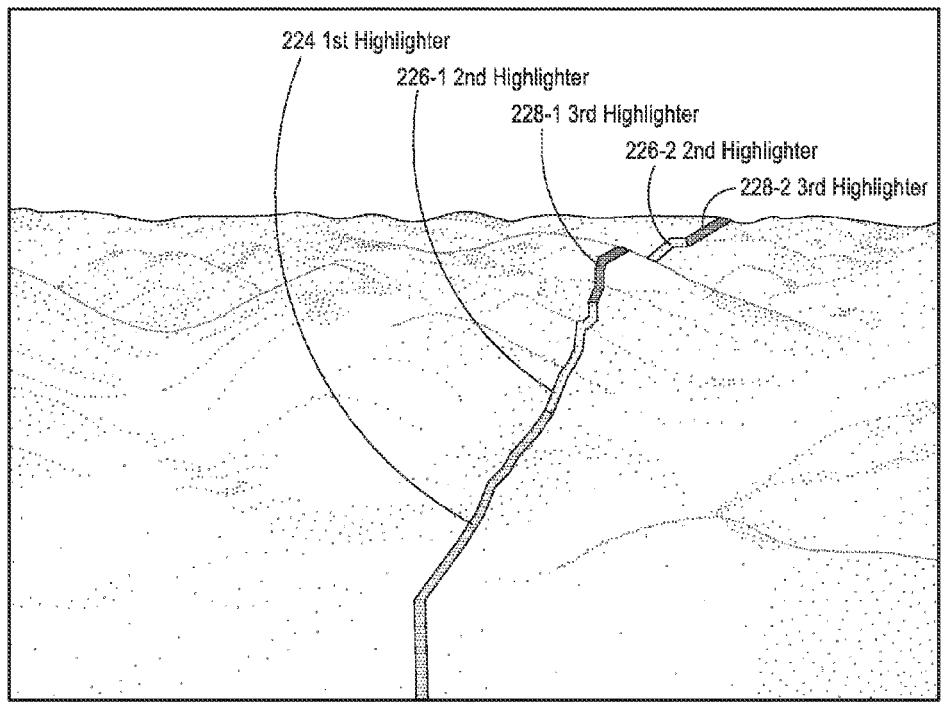
FIG. 5 depicts an example of a predicted ground track comprised of a plurality of section highlighters.
Figure 6:
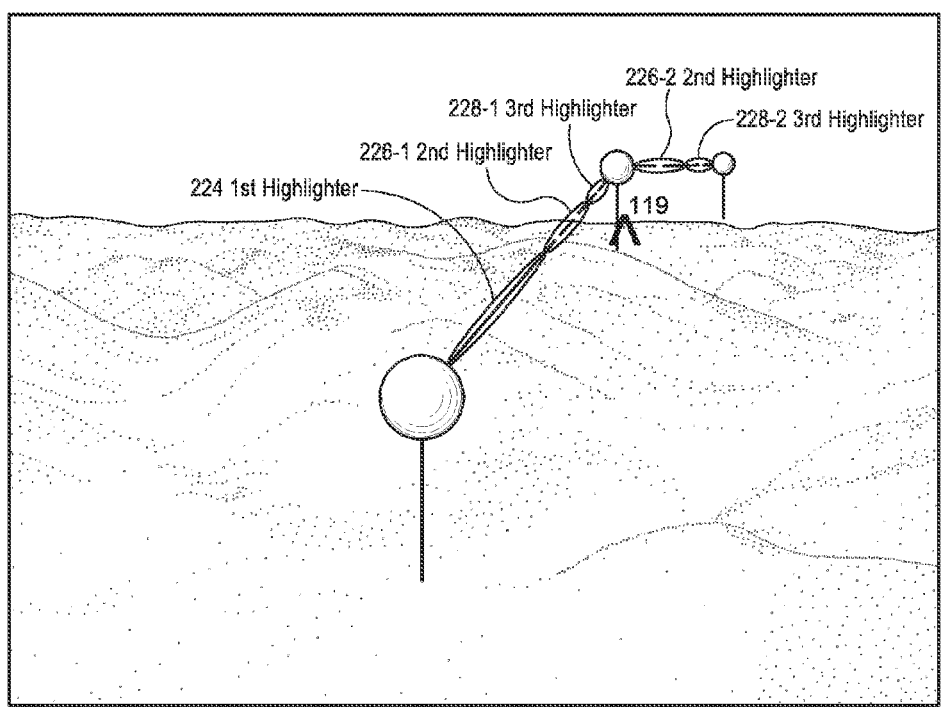
FIG. 6 depicts an example of a flight pathway comprised of a plurality of section highlighters and an altitude guidance indicator.

As illustrated in FIGS. 5 and 6, a predicted ground track and a flight pathway are shown, respectively. Each are comprised of a plurality of route section highlighters that may be presented as an overlay against a three-dimensional perspective of a scene outside the aircraft. As shown, the predicted ground track and flight pathway are comprised of first highlighter 224, second highlighters 226-1 and 226-2, and third highlighters 228-1 and 228-2. This presentation of sectioned highlighters informs the pilot that there are two sections along the predicted ground track and flight pathway where the altitude of the aircraft is less than or equal to a first TCD (as indicated by the second section highlighters 226) and two sections where the altitude of the aircraft is less than or equal to a second TCD (as indicated by the third section highlighters 228).

It should be noted that the predicted ground track and flight pathway of FIGS. 5 and 6, respectively, do not correspond to the GTP 212 of FIGS. 4A through 4D; furthermore, the configuration of the first, second, and third highlighters 224, 226, and 228 may not correspond to the configuration of the first second and third highlighters of FIGS. 4A through 4D, demonstrating a flexibility with which a manufacturer and/or end-user has when determining section highlighter configurations.

In addition to presenting a plurality of section highlighters, the IG 130 could be programmed to indicate an altitude to which the aircraft could climb to avoid or prevent the presentation of a plurality of section highlighters by determining the altitude of the highest point along the first raised GTP 208-1. As indicated in FIG. 6, the presentation of a plurality of section highlighters may be avoided if aircraft climbs to an altitude of 11,900 MSL.

A plurality of section highlighters is available or configurable to a manufacturer or end-user. As embodied herein, the section highlighters may be configured from a plethora of visual appearance configurations. For instance, if a display unit is configurable to present more than one color, each section highlighter may be configured with a different color. For the purpose of illustration only and not of limitation, a first highlighter could be comprised of the color cyan, a second highlighter could be comprised of the color magenta, a third highlighter could be comprised of the color amber (if, for instance, the TCD associated with the third highlighter corresponds to a caution alert specified in TSO-151c), and a fourth highlighter could be comprised of the color red (if, for instance, the TCD associated with the fourth highlighter corresponds to a warning alert specified in TSO-151c).

If a display unit such as a single color HUD unit is not configurable to present more than one color, other section highlighter configurations may be employed. For instance, the configurations of the first, second, and third highlighters 224, 226, and 228 of FIGS. 5 and 6 could be comprised of different levels of intensities. For example, the first highlighter 224 could be comprised of the lowest intensity of the single color while the third highlighter 228 could be comprised of the highest intensity of the single color.

Figure 7:
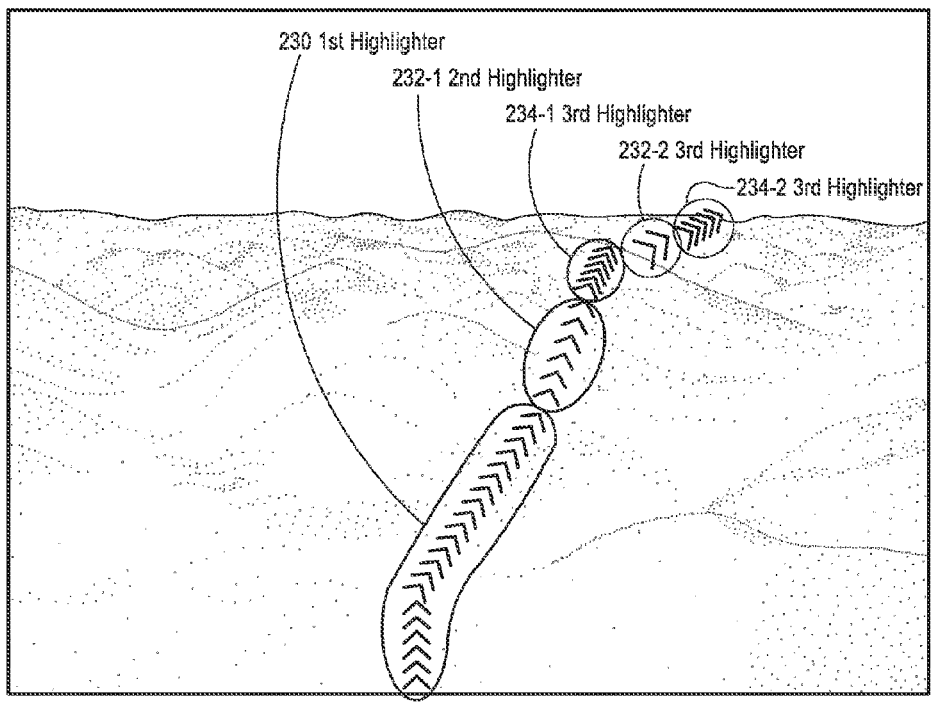
FIG. 7 depicts an example of a predicted ground track comprised of a plurality of symbols.

Section highlighters could also be comprised of symbols. While symbols may be employed by a display unit configurable to present more than one color, they may be useful for those display units limited to the presentation of one color such as a single color HUD display. Referring to FIG. 7, the predicted ground track of FIGS. 5 and 6 are comprised of a plurality of chevrons. A first section highlighter 230 is comprised of chevrons that are evenly spaced at a first interval, second section highlighters 232-1 and -2 are comprised of chevrons that are evenly spaced at a second interval, and third section highlighters 234-1 and -2 are comprised of chevrons that are evenly spaced at a third interval.

Figure 8:
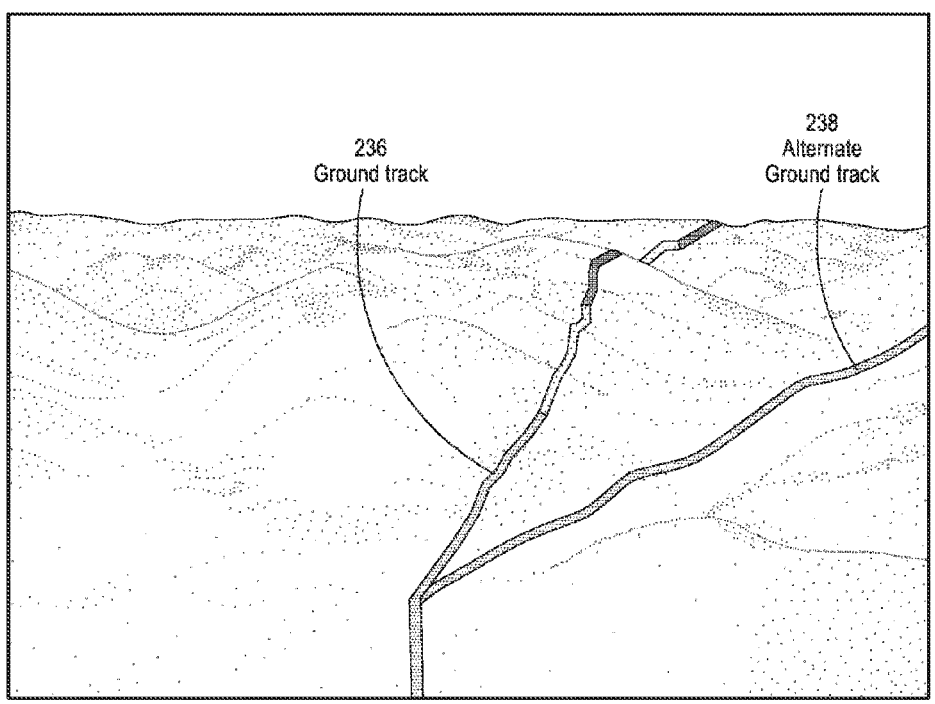
FIG. 8 depicts an example of a predicted ground track and an alternative ground track.

Referring to FIG. 8, an alternate ground track 238 may be presented along with a ground track 236 (which is the same as ground track of FIGS. 5 and 6 comprised of the first, second, and third highlighters 224, 226, and 228). As observed, the alternate ground track 238 is comprised of one section highlighter indicative of an altitude profile that has not been penetrated; that is, the altitude the aircraft is greater than or equal to the altitude of the highest point along a first raised GTP corresponding to the GTP of the ground track. The IG 130 could be programmed to construct a flight path which could ensure terrain clearance of at least a first TCD and from which a ground track could be determined. One such method for constructing a flight path has been disclosed by Young et al in U.S. Pat. No. 8,234,068 entitled "System, Module, and Method of Constructing a Flight Path used by an Avionics System," a reference incorporated herein in its entirety.

Figure 9:
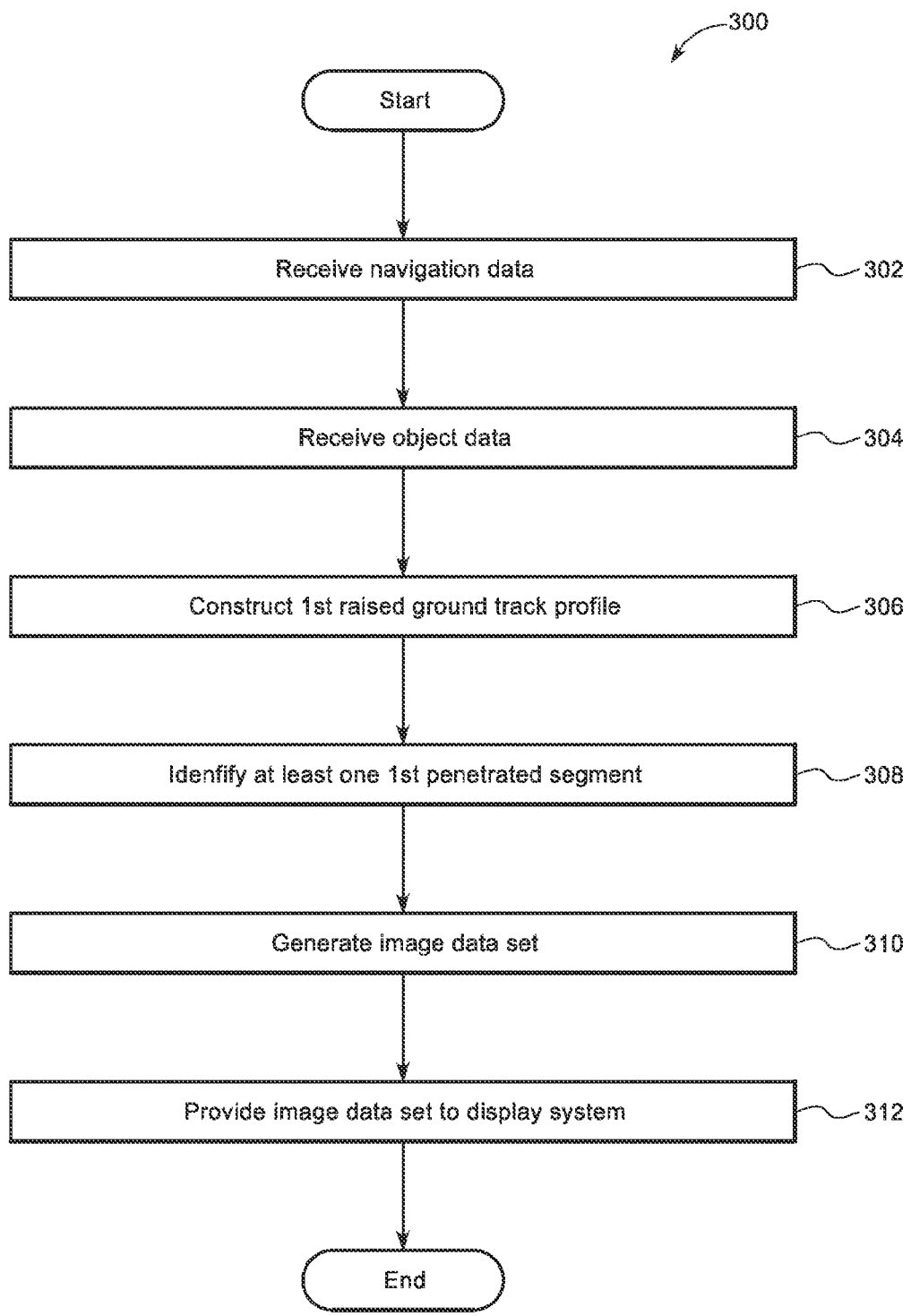
FIG. 9 provides a flowchart illustrating a method for generating and/or presenting a route image on a display unit.

FIG. 9 depicts flowchart 300 disclosing an example of a method for generating and/or presenting a route image on a display unit, where the IG 130 may be programmed or configured with instructions corresponding to the following modules embodied in the flowchart. Also, the IG 130 may be a processor of a physical or tangible module such as, but not limited to, a printed circuit board having one or more input interfaces to facilitate the two-way data communications of the IG 130, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

The flowchart 300 begins with module 302 with the receiving of navigation data representative of at least aircraft position and heading, where aircraft position includes aircraft altitude. In another embodiment, the navigation data could include data representative of a route comprised of a predicted ground track and/or a flight plan. The predicted ground track may be determined from one or more waypoints of the flight plan and/or using the instant ground track. In addition, the flight plan may be comprised of a predicted flight plan determined using instant ground track, altitude, and/or attitude information to project and predict the flight plan ahead of the aircraft. In an additional embodiment in which factors corresponding to phases of flight and/or flight attitudes are employed to determine one or more object clearance distances, the IG 130 may be programmed to retrieve navigation data representative of airport and runway information based upon aircraft position.

The flowchart continues with module 304 with the retrieving of object data representative of first locations and first elevations of a plurality of cells located along or below the route and corresponding to the navigation data. In one embodiment, the plurality of cells could be those cells located along predicted ground track. In another embodiment, the plurality of cells could be those cells located below the flight pathway of the flight plan. In another embodiment, the object data could include locations and elevations of cells that are located under a search volume as stated in TSO-151c. In another embodiment, the object data could include locations and elevations of cells that are located in a scene outside the aircraft from which an image of the scene may be generated.

The flowchart continues with module 306 with the construction of a first raised GTP as a function of the first elevations and a first object clearance distance. The first raised GTP could be positioned above the ground and comprised of second elevations at first locations.

In an additional embodiment, the IG 130 may be programmed to construct a second raised GTP as a function of the first elevations and a second object clearance requirement. The second raised GTP could be positioned above the ground and below the first raised GTP, and comprised of third elevations at first locations.

In an additional embodiment, the IG 130 may be programmed to construct a third raised GTP as a function of the first elevations and a third object clearance requirement. The third raised GTP could be positioned above the ground and below the second raised GTP, and comprised of fourth elevations at first locations. As embodied herein, the first, second, and third object clearance distances could be comprised of fixed or variable values, where the variable value(s) could correspond to a values(s) defined in TSO-151c and dependent upon factors corresponding to phases of flight and/or flight attitudes.

The flowchart continues with module 308 with the identifying of at least one first penetrated segment of the first raised GTP, if any, where each first penetrated segment is comprised of a segment of the first raised GTP located at or above the aircraft altitude. In an additional embodiment, the IG 130 may be programmed to identify at least one second penetrated segment of the second raised GTP, if any, where each second penetrated segment is comprised of a segment of the second raised GTP located at or above the aircraft altitude. In an additional embodiment, the IG 130 may be programmed to identify at least one third penetrated segment of the third raised GTP, if any, where each third penetrated segment is comprised of a segment of the third raised GTP located at or above the aircraft altitude.

The flowchart continues with module 310 with the generating of an image data set representative of a non-textual image of a divisible route (i.e., a route that may be divided into parts) configured as a plurality of route section highlighters. In one embodiment, the route section highlighter could be comprised of a ground track section highlighter. In another embodiment, the route section highlighter could be comprised of a flight pathway section highlighter. The plurality of route section highlighters may be comprised of one or more first route section highlighters and one or more second route section highlighters. Each first route section highlighter could correspond to one section which, in turn, corresponds to a non-penetrated segment; that is, each first route section highlighter could correspond to one non-penetrated segment. Likewise, each second route section highlighter could correspond to one section which, in turn, corresponds to a first penetrated segment, if any; that is, each second route section highlighter could correspond to one penetrated segment, if any.

In an additional embodiment, the plurality of route section highlighters may be further comprised of one or more third route section highlighters. Each third route section highlighter could correspond to one section and which, in turn, corresponds to a second penetrated segment; that is, each third route section highlighter could correspond to one second penetrated segment, if any. In addition, each third route section highlighter could supersede a part of a second route section highlighter.

In an additional embodiment, the plurality of route section highlighters may be further comprised of one or more fourth route section highlighters. Each fourth route section highlighter could correspond to one section and which, in turn, corresponds to a third penetrated segment; that is, each fourth route section highlighter could correspond to one third penetrated segment, if any. In addition, each fourth route section highlighter could supersede a part of a third route section highlighter.

As embodied herein, the image of the ground track could be configured with a three-dimensional viewing configuration suitable for viewing an image in which three-dimensions are presented such as, for example, an egocentric and/or exocentric views. Where the object data includes locations and elevations of cells that are located in a scene outside the aircraft, the image data set could be further representative of a three-dimensional perspective against which the image of the divisible route is presented in a three-dimensional viewing configuration, where the three-dimensional perspective could be comprised of, for example, an egocentric or exocentric view.

The flowchart continues with an optional module 312 with the providing of the image data set to one or more display units of a display system configured to receive the image data set. After being received, the image of the divisible route represented in the image data set may be presented, for instance, as an overlay on each display unit. As such, the attention of the viewer may be drawn to one or more objects corresponding to one or more penetrated segments. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting a route image on a display unit, such system comprising:
an indicating system configured to:
receive an image data set representative of an image of a divisible route provided by
an image generator including at least one avionics system processor capable of executing processor-executable code and configured to
receive navigation data representative of at least aircraft position and heading from a source of navigation data;
retrieve object data based upon the navigation data from a source of object data, where
the object data is representative of first locations and first elevations of a plurality of cells located along or below a route;
construct a first raised ground track profile as a function of the first elevations and a first object clearance distance;
identify, if any, at least one first penetrated segment of the first raised ground track profile, where
a length of each first penetrated segment is dependent upon a length of penetration of the first raised ground track profile;
generate the image data set, such that
the image of the divisible route is comprised of at least one first route section highlighter, and
if a first penetrated segment exists, at least one second route section highlighter, where
each first route section highlighter corresponds to a non-penetrated segment,
each second route section highlighter corresponds to a first penetrated segment, and
the lengths of each first route section highlighter and each second route section highlighter are dependent upon the length of each first penetrated segment; and
present the image of the divisible route on at least one display unit, whereby
the attention of a viewer is drawn to at least one penetrated segment, if any, highlighted by a second route section highlighter.

2. The system of claim 1, wherein the navigation data is further representative of airport and runway information.

3. The system of claim 1, wherein
the route is comprised of a predicted ground track, and
each route section highlighter is comprised of a ground track section highlighter.

4. The system of claim 1, wherein
the route is comprised of a flight plan, and
each route section highlighter is comprised of a flight pathway section highlighter.

5. The system of claim 1, wherein the first object clearance distance is fixed or variable.

6. The system of claim 1, wherein
the image generator is further configured to
construct a second raised ground track profile as a function of the first elevations and a second object clearance distance,
identify, if any, at least one second penetrated segment of the second raised ground track profile, where a length of each second penetrated segment is dependent upon a length of penetration of the second raised ground track profile, and the plurality of route section highlighters is further comprised of, if a second penetrated segment exists, at least one third route section highlighter, where each third route section highlighter corresponds to a second penetrated segment, and supersedes a part of a second route section highlighter.

7. The system of claim 6, wherein the image generator is further configured to construct a third raised ground track profile as a function of the first elevations and a third object clearance distance, identify, if any, at least one third penetrated segment of the third raised ground track profile, where a length of each third penetrated segment is dependent upon a length of penetration of the third raised ground track profile, and the plurality of route section highlighters is further comprised of, if a third penetrated segment exists, at least one fourth route section highlighter, where each fourth route section highlighter corresponds to a third penetrated segment, and supersedes a part of a third route section highlighter.

8. A device for generating a route image presentable on a display unit, such device comprising:

an image generator including at least one avionics system processor capable of executing processor-executable code and configured to receive navigation data representative of at least aircraft position and heading from a source of navigation data;

retrieve object data based upon the navigation data from a source of object data, where the object data is representative of first locations and first elevations of a plurality of cells located along or below a route;

construct a first raised ground track profile as a function of the first elevations and a first object clearance distance;

identify, if any, at least one first penetrated segment of the first raised ground track profile, where a length of each first penetrated segment is dependent upon a length of penetration of the first raised ground track profile;

generate an image data set representative of an image of a divisible route comprised of at least one first route section highlighter, and if a first penetrated segment exists, at least one second route section highlighter, where each first route section highlighter corresponds to a non-penetrated segment, each second route section highlighter corresponds to a first penetrated segment, and the lengths of each first route section highlighter and each second route section highlighter are dependent upon the length of each first penetrated segment; and provide the image data set to an indicating system, where the image of a divisible route is presentable to a viewer, whereby the attention of the viewer is drawn to at least one penetrated segment, if any, highlighted by a second route section highlighter.

9. The device of claim 8, wherein the route is comprised of a predicted ground track, and each route section highlighter is comprised of a ground track section highlighter.

10. The device of claim 8, wherein the route is comprised of a flight plan, and each route section highlighter is comprised of a flight pathway section highlighter.

11. The device of claim 8, wherein the image generator is further configured to construct a second raised ground track profile as a function of the first elevations and a second object clearance distance; and identify, if any, at least one second penetrated segment of the second raised ground track profile, where a length of each second penetrated segment is dependent upon a length of penetration of the second raised ground track profile, and the plurality of route section highlighters is further comprised of, if a second penetrated segment exists, at least one third route section highlighter, where each third route section highlighter corresponds to a second penetrated segment, and supersedes a part of a second route section highlighter.

12. The device of claim 11, wherein the image generator is further configured to construct a third raised ground track profile as a function of the first elevations and a third object clearance distance; and identify, if any, at least one third penetrated segment of the third raised ground track profile, where a length of each third penetrated segment is dependent upon a length of penetration of the third raised ground track profile, and the plurality of route section highlighters is further comprised of, if a third penetrated segment exists, at least one fourth route section highlighter, where each fourth route section highlighter corresponds to a third penetrated segment, and supersedes a part of a third route section highlighter.

13. A method for generating a route image presentable on a display unit, such method comprising:

receiving, at least one avionics system processor executing processor-executable code, navigation data representative of at least aircraft position and heading from a navigation data source;

retrieving object data based upon the navigation data from a source of object data, where the object data is representative of first locations and first elevations of a plurality of cells located along or below a route;

constructing a first raised ground track profile as a function of the first elevations and a first object clearance distance;

identifying, if any, at least one first penetrated segment of the first raised ground track profile, where a length of each first penetrated segment is dependent upon a length of penetration of the first raised ground track profile;

generating an image data set representative of an image of a divisible route comprised of at least one first route section highlighter, and
if a first penetrated segment exists, at least one second route section highlighter, where
each first route section highlighter corresponds to a non-penetrated segment,
each second route section highlighter corresponds to a first penetrated segment, and
the lengths of each first route section highlighter and each second route section highlighter are dependent upon the length of each first penetrated segment; and
providing the image data set to an indicating system, where the image of a divisible route is presentable to a viewer, whereby
the attention of the viewer is drawn to at least one penetrated segment, if any, highlighted by a second route section highlighter.

14. The method of claim 13, wherein
the route is comprised of a predicted ground track, and
each route section highlighter is comprised of a ground track section highlighter.

15. The method of claim 13, wherein
the route is comprised of a flight plan, and
each route section highlighter is comprised of a flight pathway section highlighter.

16. The method of claim 13, further comprising:
constructing a second raised ground track profile as a function of the first elevations and a second object clearance distance; and
identifying, if any, at least one second penetrated segment of the second raised ground track profile, where
a length of each second penetrated segment is dependent upon a length of penetration of the second raised ground track profile, and
the plurality of route section highlighters is further comprised of, if a second penetrated segment exists, at least one third route section highlighter, where
each third route section highlighter
corresponds to a second penetrated segment, and
supersedes a part of a second route section highlighter.

17. The method of claim 16, further comprising:
constructing a third raised ground track profile as a function of the first elevations and a third object clearance distance; and
identifying, if any, at least one third penetrated segment of the third raised ground track profile, where
a length of each third penetrated segment is dependent upon a length of penetration of the third raised ground track profile, and
the plurality of route section highlighters is further comprised of, if a third penetrated segment exists, at least one fourth route section highlighter, where
each fourth route section highlighter
corresponds to a third penetrated segment, and
supersedes a part of a third route section highlighter.

\* \* \* \* \*